(12) United States Patent
Liu et al.

(10) Patent No.: US 12,326,926 B2
(45) Date of Patent: Jun. 10, 2025

(54) DYNAMIC HANDWRITING AUTHENTICATION

(71) Applicant: INTERNATIONAL BUSINESS MACHINES CORPORATION, Armonk, NY (US)

(72) Inventors: Su Liu, Austin, TX (US); Barton Wayne Emanuel, Manassas, VA (US); Hamid Majdabadi, Ottawa (CA); Yang Liang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 417 days.

(21) Appl. No.: 17/820,269

(22) Filed: Aug. 17, 2022

(65) Prior Publication Data

US 2024/0061915 A1 Feb. 22, 2024

(51) Int. Cl.
G06F 21/32 (2013.01)

(52) U.S. Cl.
CPC .................... *G06F 21/32* (2013.01)

(58) Field of Classification Search
CPC ................ G06F 21/31; G06F 21/32
See application file for complete search history.

(56) References Cited

U.S. PATENT DOCUMENTS

| | | | |
|---|---|---|---|
| 8,250,632 B1 | 8/2012 | Staddon | |
| 8,782,753 B2 | 7/2014 | Lunt | |
| 9,386,004 B2 | 7/2016 | Glickfield | |
| 10,235,469 B2 | 3/2019 | Ahuja | |
| 2016/0004422 A1 | 1/2016 | Cohen | |
| 2016/0042165 A1* | 2/2016 | Nicholson | G06V 30/1423 726/19 |
| 2017/0109034 A1* | 4/2017 | Wang | G06F 40/109 |
| 2017/0237727 A1 | 8/2017 | Kapoor | |
| 2019/0026011 A1* | 1/2019 | Wang | G06F 3/0488 |
| 2019/0377863 A1* | 12/2019 | Zhao | G06F 21/36 |
| 2021/0350122 A1* | 11/2021 | Dixon | G06V 30/36 |
| 2022/0083637 A1* | 3/2022 | Alderucci | G07F 17/3241 |

FOREIGN PATENT DOCUMENTS

| | | |
|---|---|---|
| CA | 2699018 A1 | 10/2010 |
| WO | 2006085783 A1 | 8/2006 |
| WO | 2017099555 A1 | 6/2017 |

OTHER PUBLICATIONS

"Handwriting Personalization on a Touchscreen", Microsoft, Downloaded from the Internet on Jun. 22, 2022, 4 pgs., <http://hs.windows.microsoft.com/hhweb/content/m-en-us/p-6.2/id-9a111497-b562-403e-961f-643c56cca412/>.

(Continued)

*Primary Examiner* — Kostas J Katsikis
(74) *Attorney, Agent, or Firm* — Stosch Sabo

(57) ABSTRACT

Described are techniques for handwriting authentication. The techniques include defining handwriting characteristics for a user based on a set of handwriting authentication criteria. The techniques further include receiving, from a graphical user interface (GUI) of a user device associated with the user, a handwritten phrase. The techniques further include determining that the handwritten phrase satisfies a comparison threshold to the handwriting characteristics and authenticating the user device.

20 Claims, 6 Drawing Sheets

(56) References Cited

OTHER PUBLICATIONS

"IBM Advanced Handwriting Recognition V9.1.5 Download document", IBM Support, IBM, Downloaded from the Internet on Jun. 22, 2022, 2 pgs., <https://www.ibm.com/support/pages/ibm-advanced-handwriting-recognition-v915-download-document>.

Faundez-Zanuy, et al., "Handwriting Biometrics: Applications and Future Trends in e-Security and e-Health", Cognitive Computation 12, Aug. 12, 2020, 14 pgs., <https://doi.org/10.1007/s12559-020-09755-z>.

Treacy, M., "Computer Program Perfectly Replicates Your Handwriting", Treehugger, Oct. 11, 2018, 9 pgs., <https://www.treehugger.com/computer-program-perfectly-replicates-your-handwriting-4854903>.

Build A Handwritten Digit Recognizer In Watson Studio And Pytorch, Retrieved from: https://developer.ibm.com/technologies/data-science/patterns/handwritten-digit-recognizer-in-watson-studio-and-pytorch/, Nov. 19, 2018, 5 pages.

Glossary, Retrieved from: https://www.ibm.com/docs/en/sig-and-i/10.0.0?topic=glossary-#gloss_B, Jan. 24, 2023, 45 pages.

Handwriting Recognition Actions, Retrieved from: https://www.ibm.com/docs/en/datacap/9.1.6?topic=actions-handwritingrecognition, Feb. 27, 2021, 4 pages.

IBM Watson Natural Language Understanding, Retrieved from: https://www.ibm.com/products/natural-language-understanding, Jul. 13, 2023, 25 pages.

\* cited by examiner

DYNAMIC HANDWRITING AUTHENTICATION

BACKGROUND

The present disclosure relates to authentication, and, more specifically, to dynamic handwriting authentication.

Authentication relates to verifying an identity of a computer system user or other computer process. Authentication can utilize various factors to verify identity such as knowledge factors (e.g., passwords, personal identification numbers (PINs), security question answers, etc.), ownership factors (e.g., identification (ID) card, hardware security token, software security token, etc.), and/or inherence factors (e.g., biometric features such as fingerprints, retinas, faces, voices, etc.).

SUMMARY

Aspects of the present disclosure are directed toward a computer-implemented method comprising defining handwriting characteristics for a user based on a set of handwriting authentication criteria. The method further comprises receiving, from a graphical user interface (GUI) of a user device associated with the user, a handwritten phrase. The method further comprises determining that the handwritten phrase satisfies a comparison threshold to the handwriting characteristics. The method further comprises authenticating the user device.

Additional aspects of the present disclosure are directed to systems and computer program products configured to perform the method described above. The present summary is not intended to illustrate each aspect of, every implementation of, and/or every embodiment of the present disclosure.

BRIEF DESCRIPTION OF THE DRAWINGS

The drawings included in the present application are incorporated into and form part of the specification. They illustrate embodiments of the present disclosure and, along with the description, serve to explain the principles of the disclosure. The drawings are only illustrative of certain embodiments and do not limit the disclosure.

Figure 1:
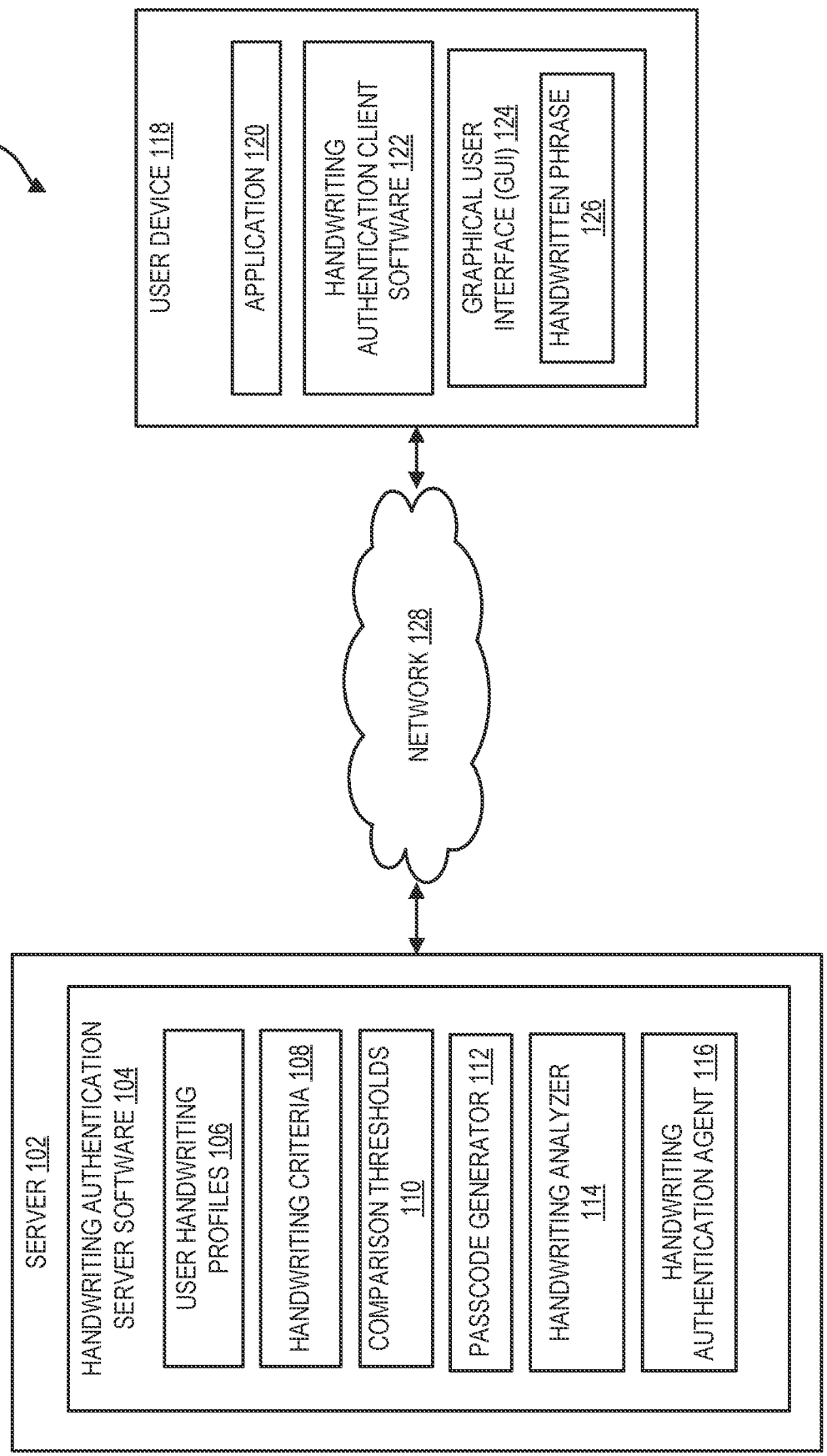
FIG. 1 illustrates a block diagram of an example computational environment implementing dynamic hardware authentication, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward authentication, and, more specifically, to dynamic handwriting authentication. While not limited to such applications, embodiments of the present disclosure may be better understood in light of the aforementioned context.

Authentication relies on one or more factors to verify a user identity. These factors can be knowledge factors, ownership factors, and/or inherence factors. As the number of factors increases, so does the security and/or reliability of the authentication process insofar as it is more difficult to compromise a multi-factor authentication process compared to a single-factor authentication process.

Handwriting authentication can combine multiple authentication factors. For example, an individual's handwriting can be as unique as traditional biometric factors (e.g., fingerprint, voice, etc.). Furthermore, handwriting authentication can utilize passcodes (e.g., something known) and/or passcodes provided to a separate device owned by the user (e.g., something owned). Thus, handwriting can be used to create a robust authentication process.

However, handwriting authentication can remain susceptible to compromise in situations where the handwriting authentication utilizes an image of a user's handwritten password as the basis for the handwriting authentication. In such situations, if a hacker steals the image of the user's handwritten password, then the hacker can spoof the handwriting authentication process using the stolen image. Thus, there is a need for handwriting authentication which overcomes the aforementioned security vulnerability.

Aspects of the present disclosure are directed to overcoming the aforementioned security vulnerability. In some embodiments, aspects of the present disclosure (i) define handwriting characteristics for a user based on a set of handwriting authentication criteria, (ii) receive, from a graphical user interface (GUI) of a user device associated with the user, a handwritten phrase, (iii) determine that the handwritten phrase satisfies a comparison threshold to the handwriting characteristics, and (iv) authenticate the user device. Regarding (i), defining handwriting characteristics can be performed by collecting handwriting data (e.g., handwriting samples) from the user through a registration process or aggregating existing handwriting data from multiple applications storing handwriting data and associated with the user. Regarding (ii), the handwritten phrase can correspond to a passcode transmitted to a user device. The passcode can be randomly generated or replicated from a historical word or phrase previously written by the user. The passcode can be a one-time, temporary passcode sent to the user device (or another device associated with the user). Regarding (iii), determining that the handwritten phrase satisfies a comparison threshold can be performed using metrics related to handwriting such as, but not limited to, curvatures of lines, spacings of lines, spacings of characters, relative sizes of lines and/or characters, script characteristics (e.g., cursive, print, capitalizations, etc.), orientations, angles, and/or lengths of or between lines and/or characters, and the like. In other embodiments, the determining that the handwritten phrase satisfies a comparison threshold can be performed using a trained machine learning model.

The aforementioned techniques provide numerous advantages. For one, in embodiments where the passcode is a one-time passcode, the dynamic handwriting authentication technique is not susceptible to replay vulnerabilities. In embodiments where the passcode is a randomly generated passcode, the dynamic handwriting authentication technique is not susceptible to passcode leakage vulnerabilities. As another example advantage, embodiments of the present disclosure can be phrase-agnostic (e.g., regardless of what the handwritten phrase contains, characteristics of the handwritten phrase can be compared to known handwriting characteristics of the user). In such embodiments, the dynamic handwriting authentication technique can be passcode-less. As yet another example advantage, embodiments of the present disclosure can utilize machine learning models to efficiently characterize handwriting characteristics that would otherwise be difficult or not intuitive to characterize, but which nonetheless has meaningful predictive power for authenticating users by handwriting characteristics.

Referring now to the figures, FIG. 1 illustrates a block diagram of an example computational environment 100 implementing dynamic hardware authentication, in accordance with some embodiments of the present disclosure. The example computational environment 100 includes a server 102 communicatively coupled to a user device 118 via a network 128.

Server 102 can be any server, computer, mainframe, or other combination of computer hardware capable of executing software. In some embodiments, server 102 can be a virtual machine (VM), container instance, or other virtualized combination of discrete physical hardware resources. User device 118 can be any computer, desktop, laptop, tablet, wearable device, smartphone, or other user device. In some embodiments, user device 118 represents two or more user devices used in tandem to perform aspects of the present disclosure. The network 128 can be a local area network (LAN), a wide area network (WAN), an intranet, the Internet, or any other network 128 or group of networks 128 capable of continuously, semi-continuously, or intermittently connecting (directly or indirectly) the aforementioned components together.

Server 102 can implement handwriting authentication server software 104 while user device 118 can implement handwriting authentication client software 122. However, as will be appreciated by one skilled in the art, in other embodiments, both handwriting authentication server software 104 and handwriting authentication client software 122 can reside on the server 102 (where the server 102 transmits information to, and receives information from, the user device 118). In other embodiments, both the handwriting authentication server software 104 and the handwriting authentication client software 122 can reside on the user device 118 (e.g., where the user device 118 downloads the aforementioned software (or a portion of the aforementioned software) from a remote data processing system, such as the server 102). Handwriting authentication server software 104 and handwriting authentication client software 122 can be collectively referred to as dynamic handwriting authentication code (e.g., see dynamic handwriting authentication code 646 of FIG. 6).

Handwriting authentication server software 104 includes user handwriting profiles 106, handwriting criteria 108, comparison thresholds 110, passcode generator 112, handwriting analyzer 114, and handwriting authentication agent 116. User device 118 includes application 120, handwriting authentication client software 122, graphical user interface (GUI) 124, and handwritten phrase 126.

Referring back to the handwriting authentication server software 104, the user handwriting profiles 106 can be user profiles that characterize handwriting of different users according to handwriting criteria 108. User handwriting profiles 106 can be based upon a predetermined number and/or type of sample handwritten characters, words, and/or phrases input by a user (e.g., via the GUI 124 and according to instructions provided by handwriting authentication client software 122 as part of a registration process) and/or based upon handwriting samples aggregated from historical sources for the user (e.g., handwriting samples collected from an application 120 that also executes on the user device 118 and supports handwriting functionality).

Handwriting criteria 108 can generally relate to features of handwriting such as, but not limited to, curvatures of lines, spacings of lines, spacings of characters, relative sizes (e.g., lengths, widths, thicknesses, etc.) of lines and/or characters, script characteristics (e.g., cursive, print, capitalizations, etc.), orientations, angles, and/or lengths of or between lines and/or characters, and the like. Thus, handwriting criteria 108 can define the measured metrics from a sample of handwriting.

Comparison thresholds 110 are one or more similarity metrics which can be used to determine whether a handwriting sample matches a known user handwriting profile 106. Comparison thresholds 110 can be tolerances of difference between one or more handwriting criteria 108 between a user handwriting profile 106 and a received handwritten phrase 126. Comparison threshold 110 can be a single, cumulative threshold that combines all differences between a user handwriting profile 106 and a handwritten phrase 126, or the comparison threshold 110 can be multiple thresholds related to one or more types of differences between a user handwriting profile 106 and a handwritten phrase 126.

Passcode generator 112 can be used to generate and transmit a passcode to the user device 118. In some embodiments, the passcode generator 112 generates a one-time passcode that is generated in response to receiving a request from the handwriting authentication client software 122 (where the handwriting authentication client software 122 can receive a request for dynamic handwriting authentication via another application 120 implemented on the user device 118). Advantageously, a one-time passcode can mitigate replay attacks. In some embodiments, passcode generator 112 generates a random passcode, where the random passcode can be a word, phrase, or random assortment of letters and/or numbers. Such a random passcode can be a passcode that randomly combines previously used words or phrases from a corresponding user handwriting profile 106, or the random passcode can be an entirely new word or phrase that need not necessarily exist in user handwriting profile 106. In other embodiments, passcode generator 112 can select, as a passcode, previously entered handwriting text in another application 120 of user device (e.g., a chat application, a note-taking application, etc.).

Handwriting analyzer 114 can be configured to characterize handwriting in the handwritten phrase 126. Handwriting analyzer 114 can generate metrics for the handwritten phrase 126 according to the handwriting criteria 108. Further, handwriting analyzer 114 can compare (e.g., using comparison thresholds 110) the generated metrics to one or more user handwriting profiles 106 to determine whether or not the handwritten phrase 126 verifies a user with a corresponding user handwriting profile 106. Handwriting analyzer 114 can implement techniques such as, but not limited to, Natural Language Processing (NLP), Optical Character Recognition (OCR), and/or other techniques related to analyzing and/or interpreting handwriting.

Handwriting authentication agent 116 can use the determination from the handwriting analyzer 114 to either authenticate or deny authentication. Handwriting authentication agent 116 can transmit the authentication determination to the handwriting authentication client software 122 on the user device 118.

Turning now to the user device 118, it contains application 120, handwriting authentication client software 122, GUI 124, and handwritten phrase 126. The application 120 can be one or more other applications executing on the user device 118 such as, for example, financial applications, health applications, entertainment applications, messaging applications, social media applications, and/or other applications. In some embodiments, application 120 can support handwriting functionality such as for creating messages, taking notes, and the like.

Handwriting authentication client software 122 can be configured to interact with handwriting authentication server software 104 on server 102 in order to provide authentication services to application 120. GUI 124 can be any individual user interface or combination of user interfaces now known or later developed that are capable of receiving a handwritten phrase. For example, GUI 124 can be a touchscreen of a smartphone that is simultaneously capable of presenting visual information to a user and receiving a handwritten phrase 126 from the user by a user applying pressure to the GUI 124 using a finger, stylus, or other writing instrument. Handwritten phrase 126 can be the passcode from the passcode generator 112 written in the user's handwriting.

Figure 2:
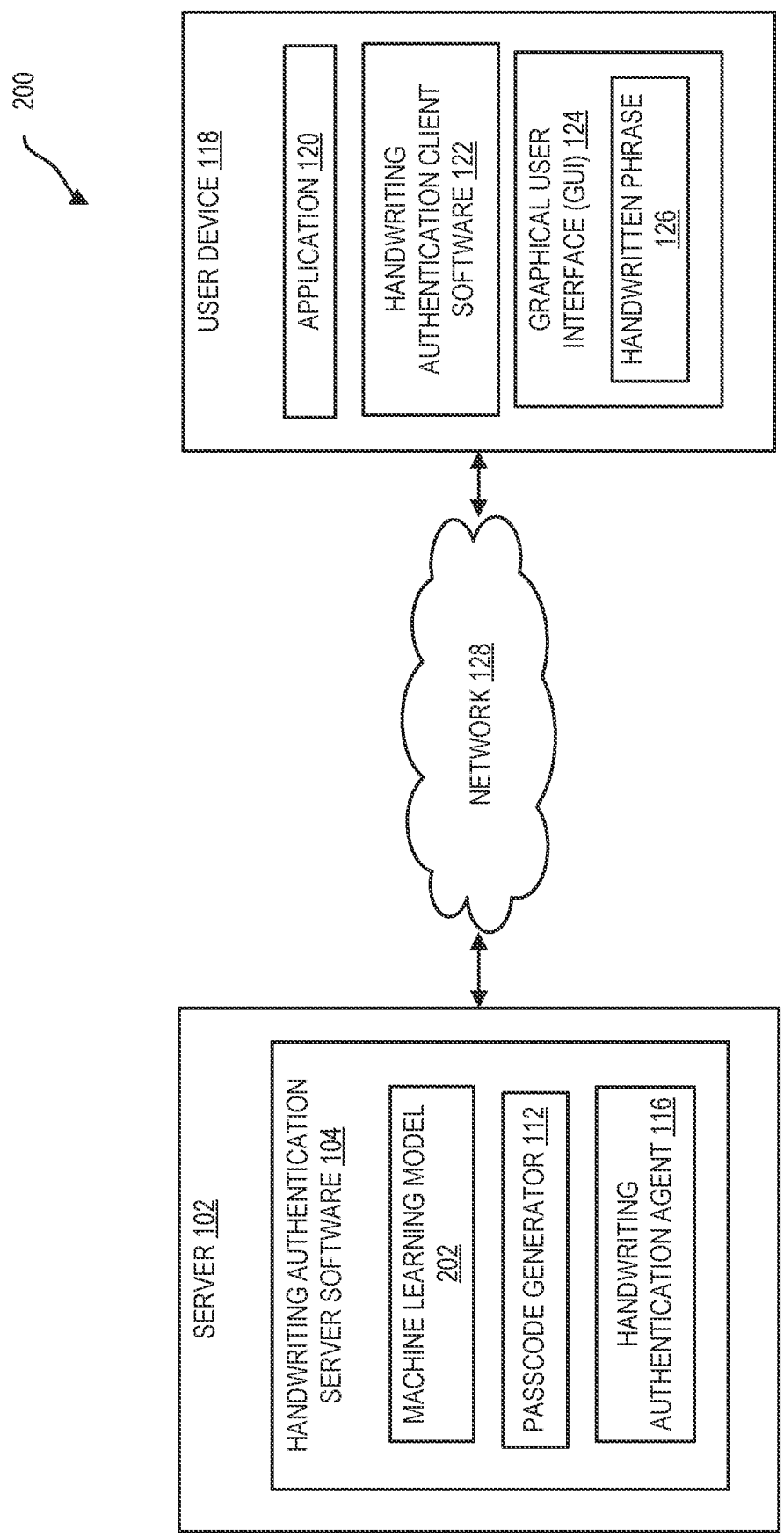
FIG. 2 illustrates a block diagram of an example computational environment implementing dynamic hardware authentication using a machine learning model, in accordance with some embodiments of the present disclosure.

FIG. 2 illustrates a block diagram of an example computational environment 200 implementing dynamic hardware authentication using a machine learning model 202, in accordance with some embodiments of the present disclosure. The example computational environment 200 includes features previously described with respect to FIG. 1 such as server 102, handwriting authentication server software 104, passcode generator 112, handwriting authentication agent 116, user device 118, handwriting authentication client software 122, GUI 124, handwritten phrase 126, and network 128.

In contrast to FIG. 1, the example computational environment 200 includes a machine learning model 202. Machine learning model 202 can be configured to characterize user profiles, identify relevant handwriting metrics, measure the relevant handwriting metrics, and identify matches, non-matches, or a probability of a match between a handwritten phrase 126 and a given user handwriting profile.

Machine learning model 202 can employ any number of machine learning algorithms such as, but not limited to, NLP, OCR, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques.

For example, machine learning model 202 can be configured to perform machine learning on handwriting data from one or more users. The machine learning model 202 can be trained on the aforementioned data using one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multi-dimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques. After training, the machine learning model 202 can ingest handwritten phrase 126 and output identification of a match with a user handwriting profile, a lack of a match with the user handwriting profile, or a probability of a match with the user handwriting profile.

As will be appreciated by one skilled in the art, features of FIG. 1 and FIG. 2 can be combined together in some embodiments. For example, machine learning functionality can be incorporated into any single functionality (or combination of functionalities) described in FIG. 1. Furthermore, machine learning functionality can be augmented to work in tandem with any, some, or all functionalities described in FIG. 1.

Figure 3:
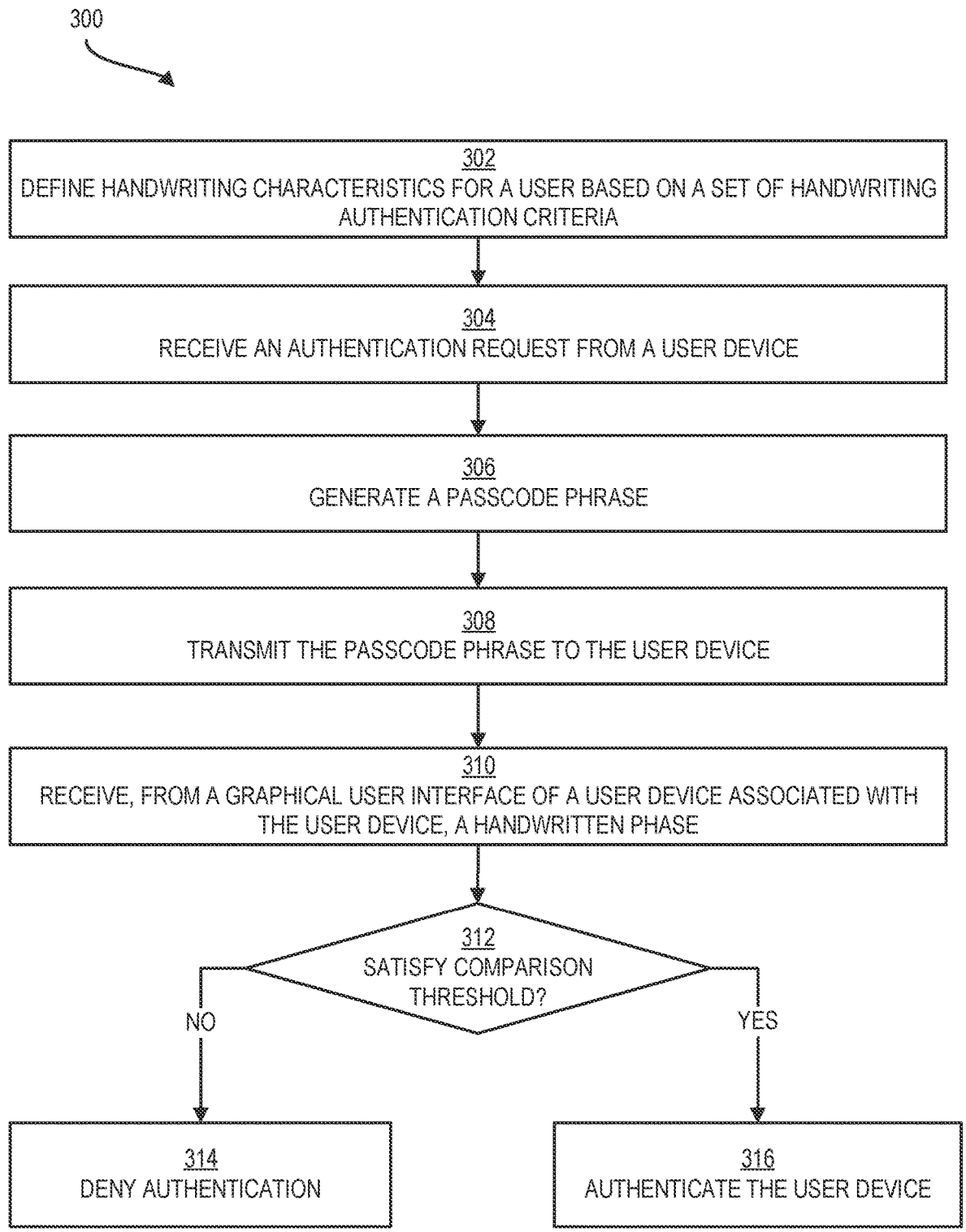
FIG. 3 illustrates a flowchart of an example method for dynamic handwriting authentication, in accordance with some embodiments of the present disclosure.

FIG. 3 illustrates a flowchart of an example method for dynamic handwriting authentication, in accordance with some embodiments of the present disclosure. In some embodiments, the method 300 is implemented by a computer, a server, a processor, a data processing system, a user device, or another configuration of hardware and/or software.

Operation 302 includes defining handwriting characteristics for a user based on a set of handwriting authentication criteria. In some embodiments, operation 302 is performed by analyzing predefined metrics associated with a set of handwriting for each specific user (e.g., curvatures of lines, spacings of lines, spacings of characters, relative sizes (e.g., lengths, widths, thicknesses, etc.) of lines and/or characters, script characteristics (e.g., cursive, print, capitalizations, etc.), orientations, angles, and/or lengths of or between lines and/or characters, etc.). In other embodiments, operation 302 is performed by training machine learning model on a set of handwriting for each specific user.

Operation 304 includes receiving an authentication request from a user device. The authentication request can be related to an application implemented on the user device. In such embodiments, the method 300 can be utilized to provide dynamic handwriting authentication as a service to the application (or multiple applications) implemented on the user device.

Operation 306 includes generating a passcode phrase. In some embodiments, operation 306 generates a one-time passcode phrase in response to receiving the authentication request in operation 304. In some embodiments, operation 306 generates a random passcode phrase, where the random passcode phrase need not include any word or phrase previously written by the user. In other embodiments, operation 306 utilizes a random, historical phrase written by the user as the passcode phrase.

Operation 308 includes transmitting the passcode phrase to the user device. Operation 310 includes receiving, from a GUI associated with the user device, a handwritten phrase repeating, in the user's handwriting, the passcode phrase.

Operation 312 includes determining whether the handwritten phrase satisfies one or more comparison thresholds to a handwriting profile of the user. In some embodiments, operation 312 includes inputting the received handwritten phrase to the trained machine learning model, and receiving, from the trained machine learning model, a determination of whether the handwritten phrase matches the handwriting profile of the user. If not (312: NO), then the method 300 proceeds to operation 314 and denies the authentication request. If so, (312: YES), then the method 300 proceeds to operation 316 and authenticates the user device.

Figure 4:
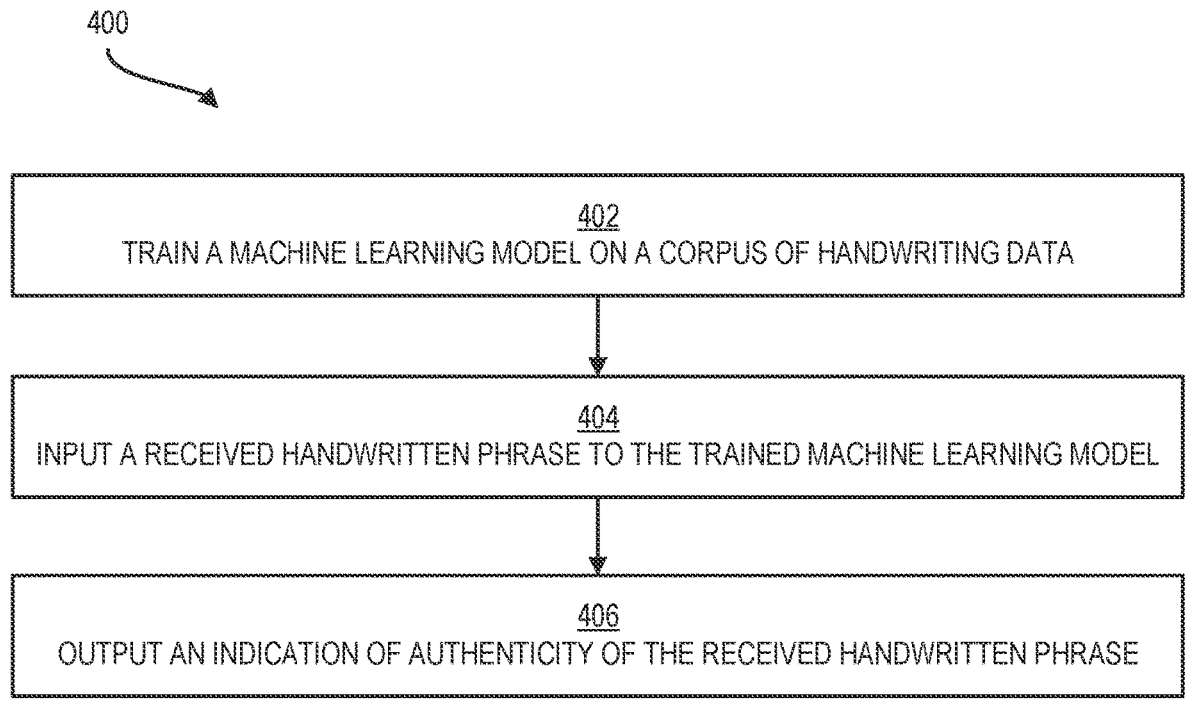
FIG. 4 illustrates a flowchart of an example method for training a machine learning model for dynamic handwriting authentication, in accordance with some embodiments of the present disclosure.

FIG. 4 illustrates a flowchart of an example method for training a machine learning model for dynamic handwriting authentication, in accordance with some embodiments of the present disclosure. In some embodiments, the method 400 is implemented by a computer, a server, a processor, a data processing system, a user device, or another configuration of hardware and/or software. In some embodiments, the method 400 occurs contemporaneously with the method 300 of FIG. 3. For example, operation 402 can occur prior to, or as part of, operation 302 of the method 300 while operations 404 and 406 can occur as part of operation 312 of the method 300.

Operation 402 includes training a machine learning model on a corpus of handwriting data. The handwriting data can include data from one user or many users. In some embodiments, operation 402 collects a predetermined amount of handwriting data from a user as part of the registration process with the dynamic handwriting authentication software discussed herein. In other embodiments, operation 402 aggregates previously created handwriting data from the user from one or more other applications utilized by the user (e.g., messaging applications, note-taking applications, etc.).

Operation 404 includes inputting a received handwritten phrase to the trained machine learning model. In some embodiments, operation 404 also inputs a user identifier for authentication, where the user identifier is associated with known writing characteristics in the machine learning model. Operation 406 includes outputting an indication of authenticity of the received handwritten phrase. Operation 406 can output, for example, an indication of a match between the handwritten phrase and a given user's handwriting profile, an indication of a lack of a match between the handwritten phrase and the given user's handwriting profile, and/or a probability of a match between the handwritten phrase and the given user's handwriting profile.

Figure 5:
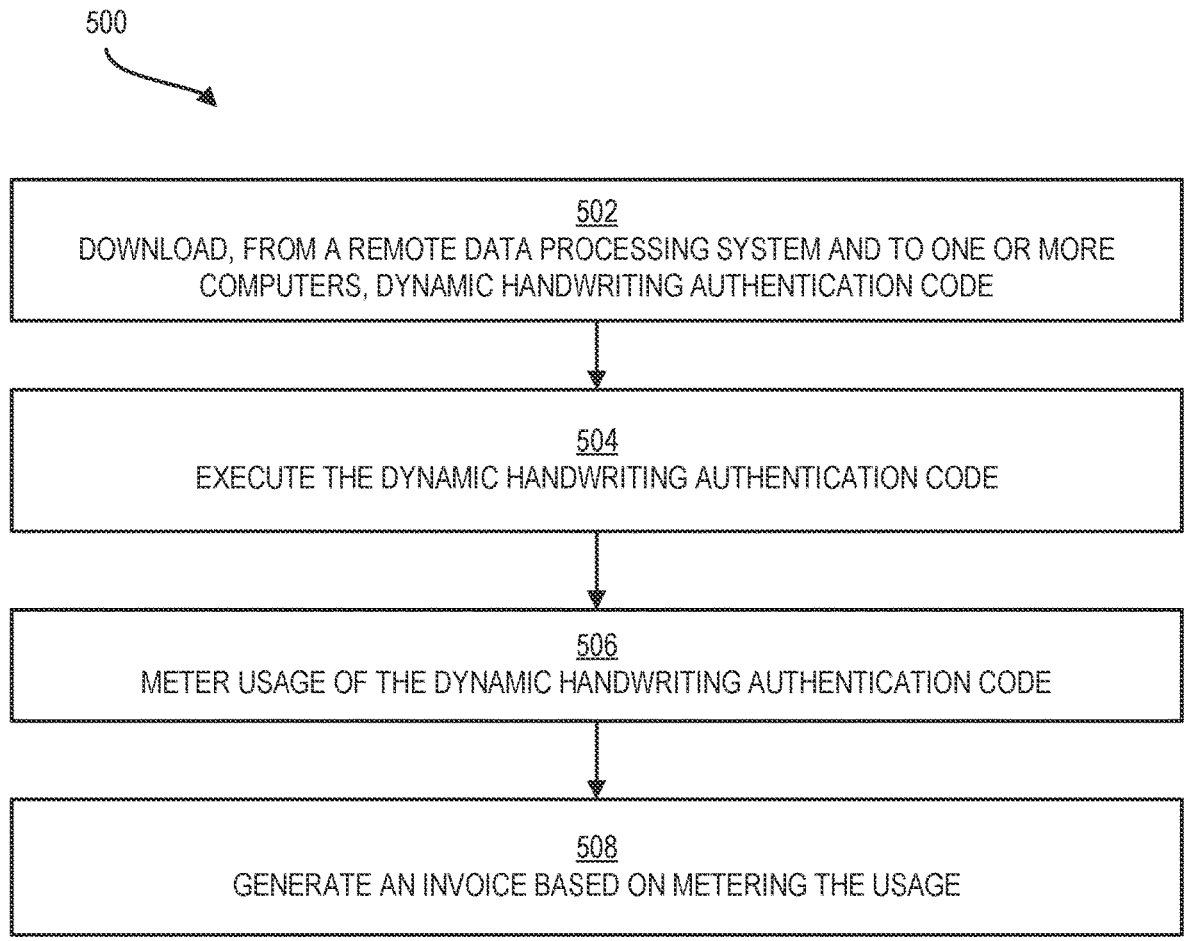
FIG. 5 illustrates a flowchart of an example method for downloading, deploying, metering, and billing usage of dynamic handwriting authentication code, in accordance with some embodiments of the present disclosure.

FIG. 5 illustrates a flowchart of an example method 500 for downloading, deploying, metering, and billing usage of dynamic handwriting authentication code, in accordance with some embodiments of the present disclosure. In some embodiments, the method 500 is implemented by a computer, a server, a processor, a data processing system, a user device, or another configuration of hardware and/or software. In some embodiments, the method 500 occurs contemporaneously with the method 300 of FIG. 3.

Operation 502 includes downloading, from a remote data processing system and to one or more computers (e.g., server 102 and/or user device 118) dynamic handwriting authentication code (e.g., one or both of handwriting authentication server software 104 and/or handwriting authentication client software 122 as discussed in FIGS. 1 and 2). Operation 504 includes executing the dynamic handwriting authentication code. Operation 504 can include performing any of the methods and/or functionalities discussed herein. Operation 506 includes metering usage of the dynamic handwriting authentication code. Usage can be metered by, for example, an amount of time the dynamic handwriting authentication code is used, a number of servers and/or devices deploying the dynamic handwriting authentication code, an amount of resources consumed by implementing the dynamic handwriting authentication code, and/or other usage metering metrics. Operation 508 includes generating an invoice based on metering the usage.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 6:
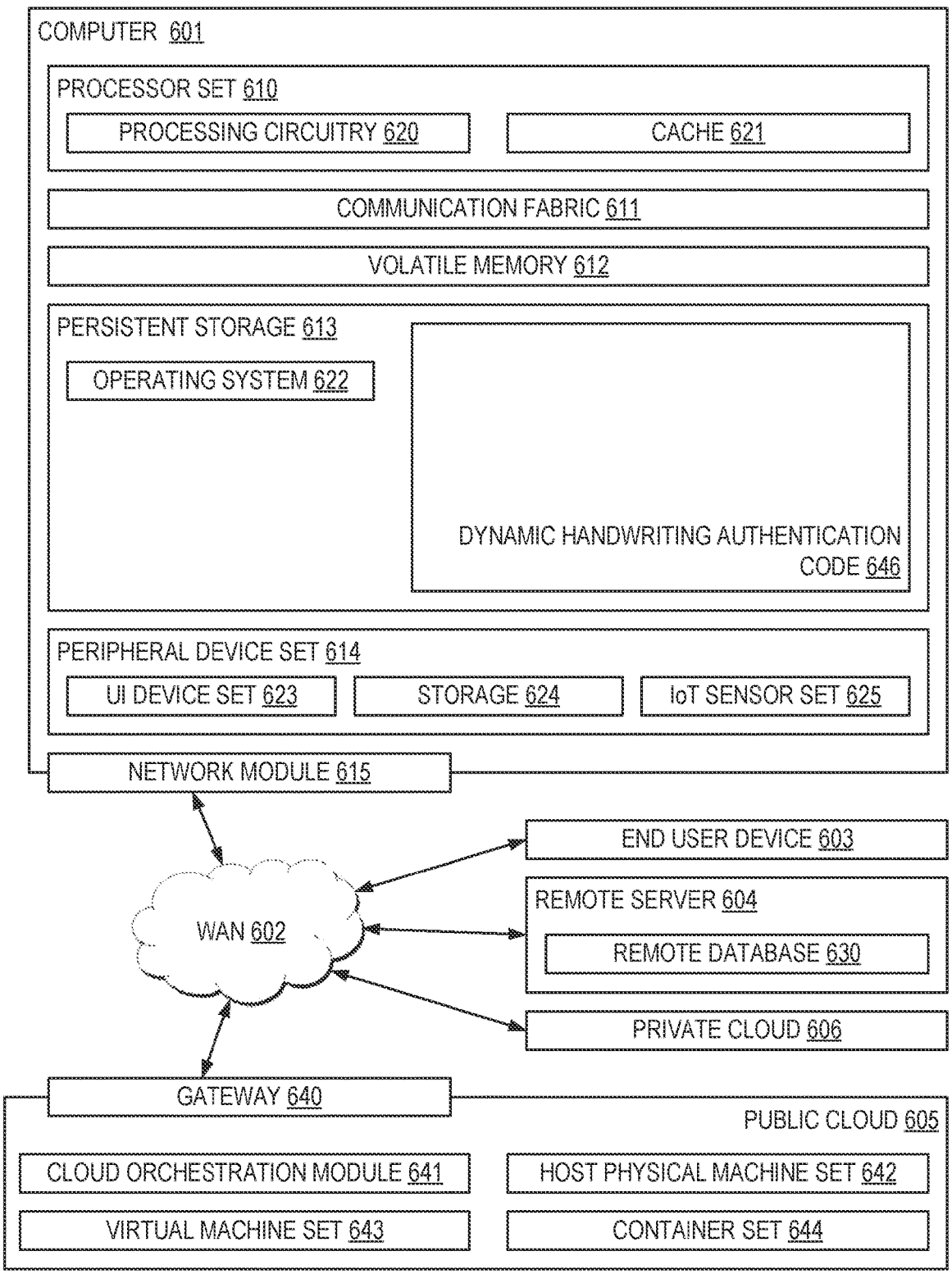
FIG. 6 illustrates a block diagram of an example computing environment, in accordance with some embodiments of the present disclosure.

FIG. 6 illustrates a block diagram of an example computing environment, in accordance with some embodiments of the present disclosure. Computing environment 600 contains an example of an environment for the execution of at least some of the computer code involved in performing the inventive methods, such as dynamic handwriting authentication code 646. In addition to dynamic handwriting authentication code 646, computing environment 600 includes, for example, computer 601, wide area network (WAN) 602, end user device (EUD) 603, remote server 604, public cloud 605, and private cloud 606. In this embodiment, computer 601 includes processor set 610 (including processing circuitry 620 and cache 621), communication fabric 611, volatile memory 612, persistent storage 613 (including operating system 622 and dynamic handwriting authentication code 646, as identified above), peripheral device set 614 (including user interface (UI), device set 623, storage 624, and Internet of Things (IoT) sensor set 625), and network module 615. Remote server 604 includes remote database 630. Public cloud 605 includes gateway 640, cloud orchestration module 641, host physical machine set 642, virtual machine set 643, and container set 644.

COMPUTER 601 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 630. As is well understood in the art of computer technology, and depending upon the technology, performance of a computer-implemented method may be distributed among multiple computers and/or between multiple locations. On the other hand, in this presentation of computing environment 600, detailed discussion is focused on a single computer, specifically computer 601, to keep the presentation as simple as possible. Computer 601 may be located in a cloud, even though it is not shown in a cloud in FIG. 6. On the other hand, computer 601 is not required to be in a cloud except to any extent as may be affirmatively indicated.

PROCESSOR SET 610 includes one, or more, computer processors of any type now known or to be developed in the future. Processing circuitry 620 may be distributed over multiple packages, for example, multiple, coordinated integrated circuit chips. Processing circuitry 620 may implement multiple processor threads and/or multiple processor cores. Cache 621 is memory that is located in the processor chip package(s) and is typically used for data or code that should be available for rapid access by the threads or cores running on processor set 610. Cache memories are typically organized into multiple levels depending upon relative proximity to the processing circuitry. Alternatively, some, or all, of the cache for the processor set may be located "off chip." In some computing environments, processor set 610 may be designed for working with qubits and performing quantum computing.

Computer readable program instructions are typically loaded onto computer 601 to cause a series of operational steps to be performed by processor set 610 of computer 601 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 621 and the other storage media discussed below. The program instructions, and associated data, are accessed by processor set 610 to control and direct performance of the inventive methods. In computing environment 600, at least some of the instructions for performing the inventive methods may be stored in dynamic handwriting authentication code 646 in persistent storage 613.

COMMUNICATION FABRIC 611 is the signal conduction paths that allow the various components of computer 601 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 612 is any type of volatile memory now known or to be developed in the future. Examples include dynamic type random access memory (RAM) or static type RAM. Typically, the volatile memory is characterized by random access, but this is not required unless affirmatively indicated. In computer 601, the volatile memory 612 is located in a single package and is internal to computer 601, but, alternatively or additionally, the volatile memory may be distributed over multiple packages and/or located externally with respect to computer 601.

PERSISTENT STORAGE 613 is any form of non-volatile storage for computers that is now known or to be developed in the future. The non-volatility of this storage means that the stored data is maintained regardless of whether power is being supplied to computer 601 and/or directly to persistent storage 613. Persistent storage 613 may be a read only memory (ROM), but typically at least a portion of the persistent storage allows writing of data, deletion of data and re-writing of data. Some familiar forms of persistent storage include magnetic disks and solid state storage devices. Operating system 622 may take several forms, such as various known proprietary operating systems or open source Portable Operating System Interface type operating systems that employ a kernel. The code included in dynamic handwriting authentication code 646 typically includes at least some of the computer code involved in performing the inventive methods.

PERIPHERAL DEVICE SET 614 includes the set of peripheral devices of computer 601. Data communication connections between the peripheral devices and the other components of computer 601 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 623 may include components such as a display screen, speaker, microphone, wearable devices (such as goggles and smart watches), keyboard, mouse, printer, touchpad, game controllers, and haptic devices. Storage 624 is external storage, such as an external hard drive, or insertable storage, such as an SD card. Storage 624 may be persistent and/or volatile. In some embodiments, storage 624 may take the form of a quantum computing storage device for storing data in the form of qubits. In embodiments where computer 601 is required to have a large amount of storage (for example, where computer 601 locally stores and manages a large database) then this storage may be provided by peripheral storage devices designed for storing very large amounts of data, such as a storage area network (SAN) that is shared by multiple, geographically distributed computers. IoT sensor set 625 is made up of sensors that can be used in Internet of Things applications. For example, one sensor may be a thermometer and another sensor may be a motion detector.

NETWORK MODULE 615 is the collection of computer software, hardware, and firmware that allows computer 601 to communicate with other computers through WAN 602. Network module 615 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 615 are performed on the same physical hardware device. In other embodiments (for example, embodiments that utilize software-defined networking (SDN)), the control functions and the forwarding functions of network module 615 are performed on physically separate devices, such that the control functions manage several different network hardware devices. Computer readable program instructions for performing the inventive methods can typically be downloaded to computer 601 from an external computer or external storage device through a network adapter card or network interface included in network module 615.

WAN 602 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 603 is any computer system that is used and controlled by an end user (for example, a customer of an enterprise that operates computer 601), and may take any of the forms discussed above in connection with computer 601. EUD 603 typically receives helpful and useful data from the operations of computer 601. For example, in a hypothetical case where computer 601 is designed to provide a recommendation to an end user, this recommendation would typically be communicated from network module 615 of computer 601 through WAN 602 to EUD 603. In this way, EUD 603 can display, or otherwise present, the recommendation to an end user. In some embodiments, EUD 603 may be a client device, such as thin client, heavy client, mainframe computer, desktop computer and so on.

REMOTE SERVER 604 is any computer system that serves at least some data and/or functionality to computer 601. Remote server 604 may be controlled and used by the same entity that operates computer 601. Remote server 604 represents the machine(s) that collect and store helpful and useful data for use by other computers, such as computer 601. For example, in a hypothetical case where computer 601 is designed and programmed to provide a recommendation based on historical data, then this historical data may be provided to computer 601 from remote database 630 of remote server 604.

PUBLIC CLOUD 605 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 605 is performed by the computer hardware and/or software of cloud orchestration module 641. The computing resources provided by public cloud 605 are typically implemented by virtual computing environments that run on various computers making up the computers of host physical machine set 642, which is the universe of physical computers in and/or available to public cloud 605. The virtual computing environments (VCEs) typically take the form of virtual machines from virtual machine set 643 and/or containers from container set 644. It is understood that these VCEs may be stored as images and may be transferred among and between the various physical machine hosts, either as images or after instantiation of the VCE. Cloud orchestration module 641 manages the transfer and storage of images, deploys new instantiations of VCEs and manages active instantiations of VCE deployments. Gateway 640 is the collection of computer software, hardware, and firmware that allows public cloud 605 to communicate through WAN 602.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 606 is similar to public cloud 605, except that the computing resources are only available for use by a single enterprise. While private cloud 606 is depicted as being in communication with WAN 602, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 605 and private cloud 606 are both part of a larger hybrid cloud.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or subset of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any software configured to perform any portion of the methods described previously and/or implement any of the functionalities described previously) can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

Any advantages discussed in the present disclosure are example advantages, and embodiments of the present disclosure can exist that realize all, some, or none of any of the discussed advantages while remaining within the spirit and scope of the present disclosure.

A non-limiting list of examples are provided hereinafter to demonstrate some aspects of the present disclosure. Example 1 is a computer-implemented method. The method includes defining handwriting characteristics for a user based on a set of handwriting authentication criteria; receiving, from a graphical user interface (GUI) of a user device associated with the user, a handwritten phrase; determining that the handwritten phrase satisfies a comparison threshold to the handwriting characteristics; and authenticating the user device.

Example 2 includes the features of Example 1. In this example, defining the handwriting characteristics for the user comprises collecting a minimum number of handwriting characters from the GUI of the user device.

Example 3 includes the features of any one of Examples 1 to 2. In this example, defining the handwriting characteristics for the user comprises tracking handwriting data input to the GUI of the user device for one or more applications executing on the user device.

Example 4 includes the features of any one of Examples 1 to 3. In this example, determining that the handwritten phrase satisfies the comparison threshold to the handwriting characteristics comprises: training a machine learning model on a corpus of handwriting data including handwriting data from the user; inputting the handwritten phrase to the machine learning model; and receiving, as output from the machine learning model, an indication that the handwritten phrase satisfies the comparison threshold.

Example 5 includes the features of any one of Examples 1 to 4. In this example, the method further comprises: transmitting, to the GUI of the user device, a passcode phrase, wherein the handwritten phrase is written by the user on the GUI according to the passcode phrase.

Example 6 includes the features of Example 5. In this example, the passcode phrase comprises a randomly generated phrase.

Example 7 includes the features of Example 5. In this example, the passcode phrase corresponds to a phrase in a corpus of handwriting data associated with the user.

Example 8 includes the features of any one of Examples 1 to 7. In this example, the method is performed by a server communicatively coupled to the user device via a network.

Example 9 includes the features of any one of Examples 1 to 7. In this example, computer-executable instructions for performing the method are downloaded from a remote data processing system to the user device, and wherein the user device executes the method.

Example 10 is a system. The system includes one or more computer readable storage media storing program instructions; and one or more processors which, in response to executing the program instructions, are configured to perform a method according to any one of Examples 1 to 9, including or excluding optional features.

Example 11 is a computer program product. The computer program product includes one or more computer readable storage media, and program instructions collectively stored on the one or more computer readable storage media, the program instructions comprising instructions configured to cause one or more processors to perform a method according to any one of Examples 1 to 9, including or excluding optional features.

What is claimed is:

1. A computer-implemented method comprising:
defining handwriting characteristics for a user based on a set of handwriting authentication criteria;
transmitting, to a graphical user interface (GUI) of a user device associated with the user, a passcode phrase comprising a randomly generated phrase;
receiving, from the GUI of the user device, a handwritten phrase based on the passcode phrase;
determining that the handwritten phrase satisfies a comparison threshold to the handwriting characteristics; and
authenticating the user device.

2. The method of claim 1, wherein defining the handwriting characteristics for the user comprises collecting a minimum number of handwriting characters from the GUI of the user device.

3. The method of claim 1, wherein defining the handwriting characteristics for the user comprises tracking handwriting data input to the GUI of the user device for one or more applications executing on the user device.

4. The method of claim 1, wherein determining that the handwritten phrase satisfies the comparison threshold to the handwriting characteristics comprises:
training a machine learning model on a corpus of handwriting data including handwriting data from the user;
inputting the handwritten phrase to the machine learning model; and
receiving, as output from the machine learning model, an indication that the handwritten phrase satisfies the comparison threshold.

5. The method of claim 1, wherein the randomly generated phrase is a random combination of words selected from a user handwriting profile associated with the user.

6. The method of claim 1, wherein the randomly generated phrase is a random combination of words that does not exist a user handwriting profile associated with the user.

7. The method of claim 1, wherein computer-executable instructions for performing the method are downloaded from a remote data processing system to the user device, and wherein the user device executes the method.

8. The method of claim 1, wherein the method is performed by a server communicatively coupled to the user device via a network.

9. A system comprising:
one or more computer readable storage media storing program instructions; and
one or more processors which, in response to executing the program instructions, are configured to perform a method comprising:
defining handwriting characteristics for a user based on a set of handwriting authentication criteria;
transmitting, to a graphical user interface (GUI) of a user device associated with the user, a passcode phrase comprising a randomly generated phrase;
receiving, from the GUI of the user device, a handwritten phrase based on the passcode phrase;
determining that the handwritten phrase satisfies a comparison threshold to the handwriting characteristics; and
authenticating the user device.

10. The system of claim 9, wherein the randomly generated phrase is a random combination of words selected from a user handwriting profile associated with the user.

11. The system of claim 9, wherein defining the handwriting characteristics for the user comprises collecting a minimum number of handwriting characters from the GUI of the user device.

12. The system of claim 9, wherein defining the handwriting characteristics for the user comprises tracking handwriting data input to the GUI of the user device for one or more applications executing on the user device.

13. The system of claim 9, wherein determining that the handwritten phrase satisfies the comparison threshold to the handwriting characteristics comprises:
training a machine learning model on a corpus of handwriting data including handwriting data from the user;
inputting the handwritten phrase to the machine learning model; and
receiving, as output from the machine learning model, an indication that the handwritten phrase satisfies the comparison threshold.

14. The system of claim 9, wherein the randomly generated phrase is a random combination of words that does not exist a user handwriting profile associated with the user.

15. A computer program product comprising one or more computer readable storage media, and program instructions collectively stored on the one or more computer readable storage media, the program instructions comprising instructions configured to cause one or more processors to perform a method comprising:
- defining handwriting characteristics for a user based on a set of handwriting authentication criteria;
- transmitting, to a graphical user interface (GUI) of a user device associated with the user, a passcode phrase comprising a randomly generated phrase;
- receiving, from the GUI of the user device, a handwritten phrase based on the passcode phrase;
- determining that the handwritten phrase satisfies a comparison threshold to the handwriting characteristics; and
- authenticating the user device.

16. The computer program product of claim 15, wherein the randomly generated phrase is a random combination of words selected from a user handwriting profile associated with the user.

17. The computer program product of claim 15, wherein defining the handwriting characteristics for the user comprises collecting a minimum number of handwriting characters from the GUI of the user device.

18. The computer program product of claim 15, wherein defining the handwriting characteristics for the user comprises tracking handwriting data input to the GUI of the user device for one or more applications executing on the user device.

19. The computer program product of claim 15, wherein determining that the handwritten phrase satisfies the comparison threshold to the handwriting characteristics comprises:
- training a machine learning model on a corpus of handwriting data including handwriting data from the user;
- inputting the handwritten phrase to the machine learning model; and
- receiving, as output from the machine learning model, an indication that the handwritten phrase satisfies the comparison threshold.

20. The computer program product of claim 15, wherein the randomly generated phrase is a random combination of words that does not exist a user handwriting profile associated with the user.

* * * * *